United States Patent
Dakroub et al.

(10) Patent No.: US 7,656,600 B2
(45) Date of Patent: Feb. 2, 2010

(54) MONITORING TRANSDUCER POTENTIAL TO DETECT AN OPERATING CONDITION

(75) Inventors: Housan Dakroub, Dearborn Heights, MI (US); Stefan Andrei Ionescu, Burnsville, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 340 days.

(21) Appl. No.: 11/747,644

(22) Filed: May 11, 2007

(65) Prior Publication Data

US 2008/0278835 A1  Nov. 13, 2008

Related U.S. Application Data

(60) Provisional application No. 60/840,357, filed on Aug. 25, 2006.

(51) Int. Cl.
    *G11B 5/09* (2006.01)
(52) U.S. Cl. ........................................ 360/46
(58) Field of Classification Search ............... 360/46, 360/68, 25, 27, 75, 319, 77.03, 31; 385/51, 385/57; 369/44.23; 318/603; 330/261; 310/316.01; 323/288
    See application file for complete search history.

(56) References Cited

U.S. PATENT DOCUMENTS

| | | | | |
|---|---|---|---|---|
| 4,287,529 A * | 9/1981 | Tatami et al. | ................. | 386/51 |
| 4,549,231 A * | 10/1985 | Namiki | ........................ | 386/57 |
| 4,811,133 A * | 3/1989 | Nakadai et al. | .......... | 360/77.03 |
| 4,959,599 A * | 9/1990 | Nakadai et al. | ............. | 318/603 |
| 5,812,028 A * | 9/1998 | Adachi et al. | ................ | 330/261 |
| 6,019,503 A * | 2/2000 | Abraham et al. | ................ | 374/4 |
| 6,411,458 B1 | 6/2002 | Billings et al. | | |
| 6,452,735 B1 | 9/2002 | Egan et al. | | |
| 6,665,239 B1 * | 12/2003 | Takahashi et al. | ......... | 369/44.23 |
| 6,801,376 B2 | 10/2004 | Smith | | |
| 7,023,647 B2 * | 4/2006 | Bloodworth et al. | .......... | 360/75 |
| 7,068,458 B2 | 6/2006 | Huang et al. | | |
| 7,151,651 B1 | 12/2006 | Cross et al. | | |
| 7,375,912 B2 * | 5/2008 | Brannon et al. | ................ | 360/75 |
| 7,501,738 B2 * | 3/2009 | Nozasa et al. | .......... | 310/316.01 |
| 7,545,608 B2 * | 6/2009 | Araki et al. | .................. | 360/319 |
| 2002/0001151 A1 | 1/2002 | Lake | | |
| 2002/0053590 A1 | 5/2002 | Lennard et al. | | |
| 2003/0007268 A1 | 1/2003 | Smith | | |
| 2003/0048098 A1 * | 3/2003 | Tran | ........................... | 323/288 |
| 2003/0048571 A1 | 3/2003 | Soyama et al. | | |
| 2003/0053239 A1 | 3/2003 | Jiang | | |
| 2003/0067698 A1 | 4/2003 | Dakroub et al. | | |
| 2003/0214761 A1 | 11/2003 | Freitag et al. | | |
| 2004/0109253 A1 | 6/2004 | Nishiyama et al. | | |
| 2005/0088769 A1 | 4/2005 | Baumgart et al. | | |
| 2005/0088772 A1 | 4/2005 | Baumgart et al. | | |
| 2006/0072230 A1 | 4/2006 | Eaton et al. | | |
| 2007/0070534 A1 * | 3/2007 | Aemireddy et al. | ........... | 360/25 |

OTHER PUBLICATIONS

L6316-4-Channel Low Power Preamplifier—Data Brief, www.st.com, STMicroelectronics, Sep. 2004, (6 pgs).

* cited by examiner

*Primary Examiner*—Fred Tzeng
(74) *Attorney, Agent, or Firm*—Kirk A. Cesari; Westman, Champlin & Kelly, P.A.

(57) ABSTRACT

The disclosure is related to detecting a fault condition of a transducer for reading and writing data to a data storage medium. The fault condition can be detected based on a potential difference between a reference voltage and a common mode of the transducer.

23 Claims, 7 Drawing Sheets

MONITORING TRANSDUCER POTENTIAL TO DETECT AN OPERATING CONDITION

The present application claims priority from U.S. provisional patent application No. 60/840,357 filed on Aug. 25, 2006, entitled "Fault Detection System and Method," and having inventors Housan Dakroub and Stefan Andrei Ionescu, the contents of which are expressly incorporated herein by reference in their entirety.

FIELD

The present disclosure relates generally to detecting an operating condition using a transducer.

BACKGROUND

High performance disc drives achieve a real bit densities in the range of several gigabits per square centimeter (Gbits/$cm^2$). Higher recording densities can be achieved by increasing the number of bits per centimeter stored along each information track, and/or by increasing the number of tracks per centimeter written across each recording surface. Capacity increases gained through increasing the bits per centimeter stored on each track generally require improvements in the read/write channel electronics to enable data to be written to and subsequently read from the recording surface at a correspondingly higher frequency.

As density increases through increased bits per centimeter along the information track, controlling a fly height of the read/write head relative to the information track becomes more demanding. The ability to control the fly height of the read/write head relative to the information track through the mechanical configuration of the disc drive can no longer be depended on to produce disc drives while maintaining high yields in the manufacturing process.

Additionally, as the Read/Write transducer becomes more and more sensitive to electrical overstress, methods to protect the transducer have been implemented. Some of these methods employ an electrically removable resistive shunt (ERS) across the read transducer. The shunt is electrically removed at some stage in the manufacturing process. shunt (ERS) across the read transducer. The shunt is electrically removed at some stage in the manufacturing process.

Therefore challenges remain and needs persist for means of measuring the fly height of the read/write head within an assembled disc drive, referred to as an "in-situ" operation, absent the external measurement equipment to provide a basis for fly height control of the read/write head in a disc drive. In addition, a method to verify the complete removal of the shunt is needed.

SUMMARY

The disclosure is related to detecting a fault condition of a transducer for reading and writing data to a data storage medium. The fault condition can be detected based on a potential difference between a reference voltage and a common mode of the transducer.

In a particular embodiment, a method includes measuring a potential difference between a reference voltage and a common mode of a transducer for reading and writing data to a data storage medium. The method can also include determining when a fault condition of the transducer exists based on the potential difference.

In another particular embodiment, a method includes receiving, at a first input of a preamplifier, a first signal from a transducer. The method can also include providing a reference voltage to a second input of the preamplifier. The can also include generating a second signal at the preamplifier based on a difference between the first signal and the reference voltage. The method can also include determining an operating characteristic of the transducer based on the second signal.

In yet another particular embodiment, a system may include an amplifier having a first input and a second input. The first input can be coupled to receive a common mode signal from a transducer. The system can also include a switch to selectively couple the second input of the amplifier to one of a first reference voltage and a second reference voltage. At least one fault condition can be determined based on a position of the first switch.

DETAILED DESCRIPTION

In the following detailed description of the embodiments, reference is made to the accompanying drawings which form a part hereof, and in which are shown by way of illustration of specific embodiments. It is to be understood that other embodiments may be utilized and structural changes may be made without departing from the scope of the present invention.

The present disclosure is directed to systems and methods of operating condition detection. In an embodiment, a system is disclosed that includes an amplifier having a first input and a second input. The first input is coupled to receive a common mode signal from a transducer. The system also includes a switch to selectively couple the second input of the amplifier to one of a first reference voltage and a second reference voltage. At least one fault condition is determinable based on a position of the first switch.

In another embodiment, a method of detecting a fault condition of a transducer for reading and writing data to a data storage medium is disclosed. The method includes measuring a potential difference between a reference voltage and a common mode of the transducer. The method includes comparing the potential difference to a threshold. The method further includes determining when a fault condition exists based on the comparing the potential difference to the threshold.

In another embodiment, a method is disclosed that includes receiving, at a first input of a preamplifier, a first signal from a transducer. The method includes providing a reference voltage to a second input of the preamplifier via a switch. The switch may be selectively coupled to at least one of a heater driver output and a ground. The method includes generating a second signal at the preamplifier based on a difference between the first signal and the reference voltage. The method further includes determining an operating characteristic of the transducer based on the second signal.

Figure 1:
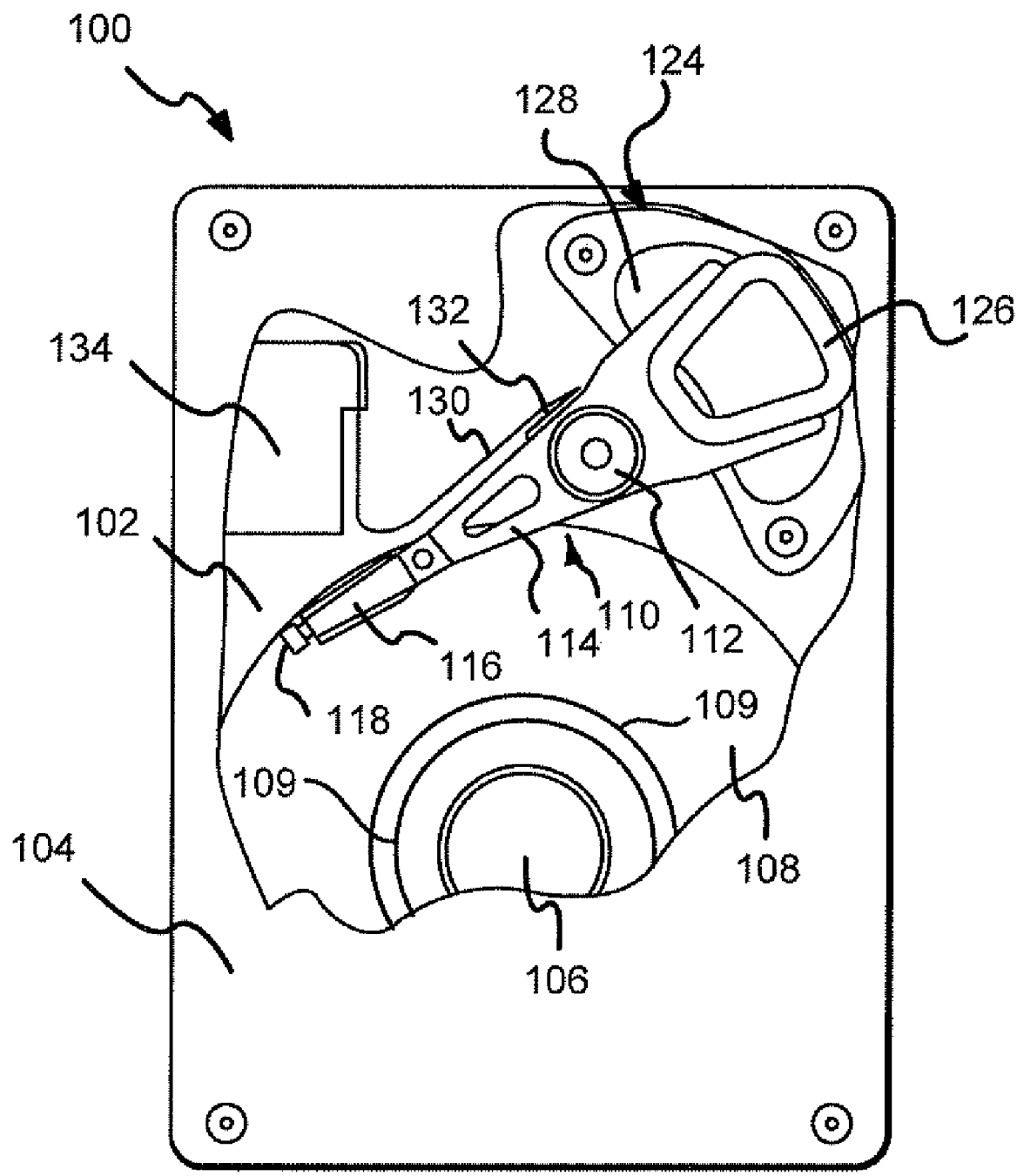
FIG. 1 is a cutaway view of an illustrative embodiment of a disc drive.

Referring to FIG. 1, in a particular embodiment, a disc drive 100 includes a base 102 to which various components of the disc drive 100 are mounted. A top cover 104, shown partially cut away, cooperates with the base 102 to form an internal, sealed environment for the disc drive. The components of the disc drive 100 include a spindle motor 106, which rotates one or more discs 108. Information is written to and read from tracks on the discs 108 through the use of an actuator assembly 110 that rotate about a bearing shaft assembly 112 positioned adjacent the discs 108. The actuator assembly 110 includes one or more actuator arms 114 that extend toward the discs 108, with one or more flexures 116 extending from the actuator arms 114. Mounted at the distal end of each of the flexures 116 is a head 118 including an air bearing slider (not shown) that enables the head 118 to fly in close proximity above the corresponding surface of the associated disc 108.

The track position of the heads 118 is controlled, during a seek operation, through the use of a voice coil motor (VCM) 124 that typically includes a coil 126 attached to the actuator assembly 110, as well as one or more permanent magnets 128 that establish a magnetic field in which the coil 126 is immersed. The controlled application of current to the coil 126 causes magnetic interaction between the permanent magnets 128 and the coil 126 so that the coil 126 moves in accordance with the well-known Lorentz relationship. As the coil 126 moves, the actuator assembly 110 pivots about the bearing shaft assembly 112, and the heads 118 are caused to move across the surfaces of the discs 108.

A flex assembly 130 provides requisite electrical connection paths for the actuator assembly 110 while allowing pivotal movement of the actuator assembly 110 during operation. The flex assembly 130 can include a printed circuit board 132 to which head wires (not shown) are connected. The head wires may be routed along the actuator arms 114 and the flexures 116 to the heads 118. The printed circuit board 132 may include circuitry for controlling the write currents applied to the heads 118 during a write operation and a preamplifier (not shown) for amplifying read signals generated by the heads 118 during a read operation. The flex assembly 130 terminates at a flex bracket 134 for communication through the base 102 to a disc drive printed circuit board (not shown) mounted to the disc drive 100.

As shown in FIG. 1, a plurality of nominally circular, concentric tracks 109 are located on the surface of the discs 108. Each track 109 includes a number of servo fields that are interspersed with user data fields along the track 109. The user data fields are used to store user data, and the servo fields are used to store servo information used by a disc drive servo system to control the position of the heads 118.

In a particular embodiment, the heads 118 can have a small heater coil (not shown) embedded in them that is used to adjust the protrusion of a read element (not shown) and a write element (not shown) in order to fine tune a distance between the read and write elements (not shown) and the magnetic surface of the discs 108. Firmware is used to adjust a current through the heater coil (not shown). The current affects the heater coil's thermal expansion and moves the read and write elements (not shown) closer to or farther from the discs 108. The actuation of the read and write elements generated by the heater coil may be sufficient to cause the heads 118 to contact the discs 108 when an excessive current is applied to the heater coil. During the manufacturing process of a disc drive 100, the heads 118 are intentionally made to contact the discs 108 using the heater coil so that correct heater current values can be determined for each of the heads 118.

Figure 2:
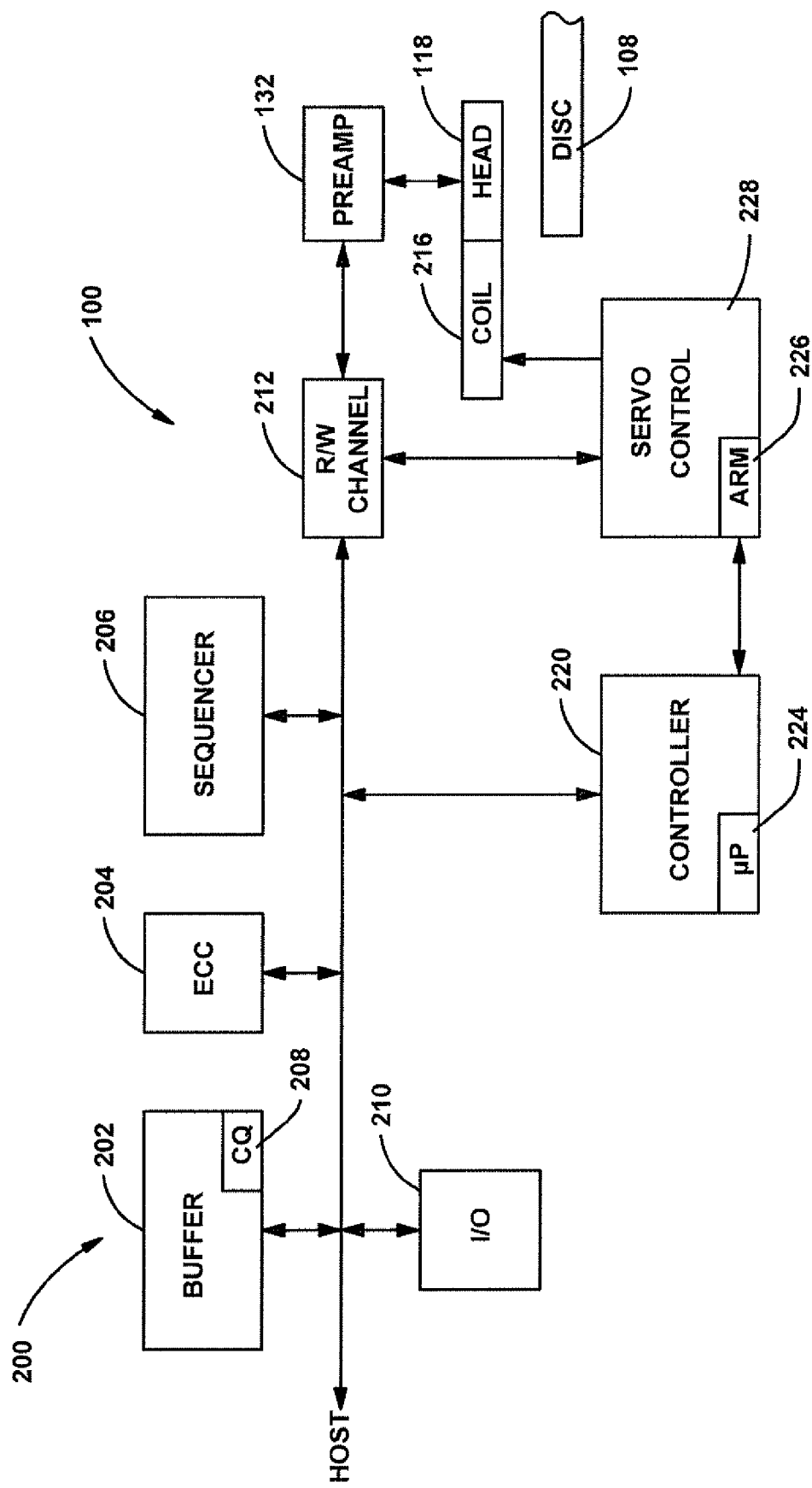
FIG. 2 is a block diagram of an illustrative embodiment of a disc drive system.

FIG. 2 provides a functional block diagram of the disc drive 100. A hardware/firmware based interface circuit 200 communicates with a host device (such as a personal computer, not shown) and directs overall disc drive operation. The interface circuit 200 includes a programmable controller 220 with associated microprocessor 224 and memory 230. In a particular embodiment, memory 230 is a first-in-first-out (FIFO) buffer. The interface circuit 200 also includes a buffer 202, an error correction code (ECC) block 204, a sequencer 206, and an input/output (I/O) control block 210.

The buffer 202 temporarily stores user data during read and write operations, and includes a command queue (CQ) 208 where multiple pending access operations are temporarily stored pending execution. The ECC block 204 applies on-the-fly error detection and correction to retrieved data. The sequencer 206 asserts read and write gates to direct the reading and writing of data. The I/O block 210 serves as an interface with the host device.

FIG. 2 further shows the disc drive 100 to include a read/write (R/W) channel 212 which encodes data during write operations and reconstructs user data retrieved from the discs 108 during read operations. A preamplifier/driver circuit (preamp) 132 applies write currents to the heads 118 and provides pre-amplification of readback signals.

A servo control circuit 228 uses servo data to provide the appropriate current to the coil 216 to position the heads 118. The controller 220 communicates with a processor 226 to move the heads 118 to the desired locations on the discs 108 during execution of the various pending commands in the command queue 208.

Figure 3:
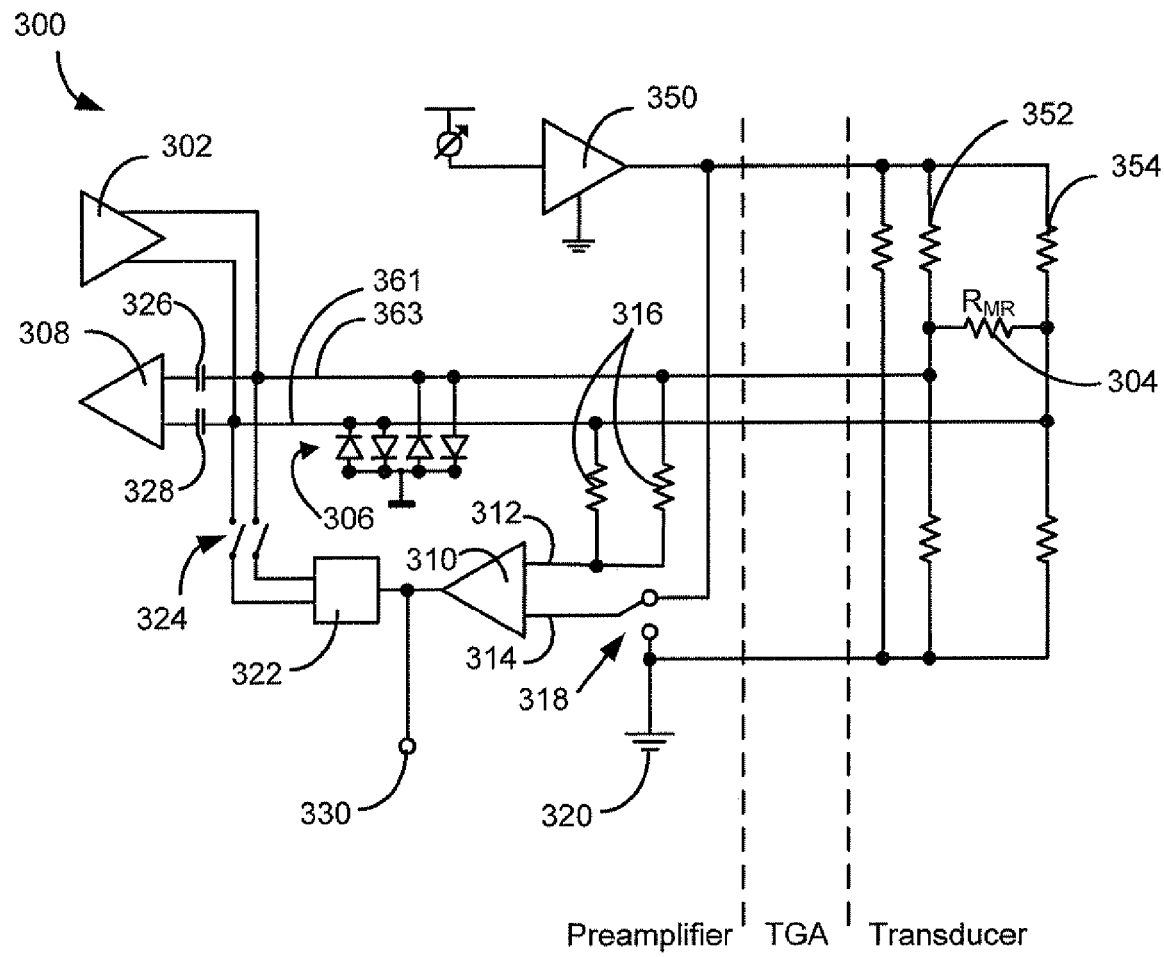
FIG. 3 is a diagram of a particular illustrative embodiment of a circuit representation of a portion of a data storage device.

Referring to FIG. 3, a diagram of a particular illustrative embodiment of a circuit representation of a portion of a data storage device is depicted and generally designated 300. The circuit representation 300 includes a first amplifier 302 having a first output coupled to a first line 361 and a second output coupled to a second line 363. A first resistive element $R_{MR}$ 304 is coupled between the lines 361 and 363. Diodes 306 are coupled between the first line 361 and ground and also between the second line 363 and ground to regulate a signal on the lines 361 and 363. A second amplifier 308 has a first input that is coupled to the first line 361 via a first capacitor 326 and further has a second input that is coupled to the second line 363 via a second capacitor 328. An output of a heater driver 350 is coupled to the first line 361 via a second resistive element 352 and to the second line 363 via a third resistive element 354. The first line 361 and the second line 363 each indicate an electrical path between components, and may be provided via wires, conductive materials, semi-conductive materials, any other type of material providing an electrical path, or any combination thereof.

The circuit representation 300 further includes a third amplifier 310 having a first input 312 and a second input 314. The first input 312 is coupled to a voltage divider 316 that is coupled between the first line 361 and the second line 363. The second input 314 is coupled to a first switching element 318. In a first position, the first switching element 318 couples the second input 314 to an output of the heater driver 350. In a second position, the first switching element 318 couples the second input 318 to a ground 320. An output 330 of the third amplifier 310 is coupled to low pass filter (LPF) 322. Outputs of the LPF 322 are coupled to the first line 361 and the second line 363 via a second switching element 324. In a particular embodiment, one or more controllers (not shown) or other logic may control at least one of the first switching element 318 and the second switching element 324.

In a particular embodiment, the $R_{MR}$ 304 may represent a resistance across a data read element of a transducer that varies in response to a magnetic field of a data storage medium (not shown) in proximity to the $R_{MR}$ 304. In a particular embodiments the $R_{MR}$ 304 may represent an electrical resistance of a magnetoresistive (MR) read element in a disc drive transducer. The first amplifier 302 may provide a differential bias across the $R_{MR}$ 304. The second amplifier 308 may amplify a differential signal across the $R_{MR}$ 304 that is generated by the differential bias across the varying resistance of the $R_{MR}$ 304. The second amplifier 308 may provide an output signal to a read channel (not shown). In a particular embodiment, the first amplifier 302, the second amplifier 308, and the third amplifier 310 may be components of a preamplifier circuit.

During operation, in a particular embodiment, presence of the second resistive element 352, the third resistive element 354, or any combination thereof, may be detectable via a signal at the output 330. In a particular embodiment, the resistive elements 352 and 354 may represent electrically removable resistive shunts that were not completely removed during a manufacturing process. To detect the resistive elements 352 and 354, the first switching element 318 may be configured such that the third amplifier 310 compares a common mode potential across the $R_{MR}$ 304 at the first input 312 to the output of the heater driver 350 at the second input 314. The second switching element 324 may be configured to disconnect the LPF 322 from the lines 361 and 363 during detection of the resistive elements 352 and 354. The third amplifier 310 may thus generate a signal at the output 330 that is indicative of a presence or absence of one or more of the resistive element 352 and 354.

In a particular embodiment, an electrical discharge from a charged surface to the transducer may also be detectable via a signal at the output 330. The first switching element 318 may be configured so that the third amplifier 310 compares a common mode potential across the $R_{MR}$ 304 at the first input 312 to the ground 320 at the second input 314. In a particular embodiment, the ground 320 may be one of a preamplifier ground and a system ground. The second switching element 324 may be configured to couple the first line 361 and the second line 363 to respective outputs of the LPF 322. In a particular embodiment, an electrostatic discharge to or from the transducer, such as via contact with a tribocharging signal bearing surface, may be determined based on a resultant signal at the output 330.

In a particular embodiment, an electrostatic discharge may arise from non-intentional contact with an imperfection or contaminant on the signal-bearing surface, such as a thermal asperity that causes temporary errors in reading data from the surface. Such incidental contacts may be determined based on a resultant signal at the output 330 and may be identified and mapped for future reference in the drive operation. In a particular embodiment, severe asperities may be detected and burnished to avoid future contacts to the read transducer.

In a particular embodiment, the transducer may also include a write element (not shown). The common mode potential across the $R_{MR}$ 304 may be measured via the third amplifier 310 while performing a write operation to the data storage medium using the write element. In a particular embodiment, the third amplifier 310 may be a component of at least one of an Analog Buffer Head Voltage (ABHV) circuit of a preamplifier, a Read Head Buffer Voltage (RHBV) circuit of the preamplifier, or a common mode bias loop circuit of the preamplifier.

Figure 4:
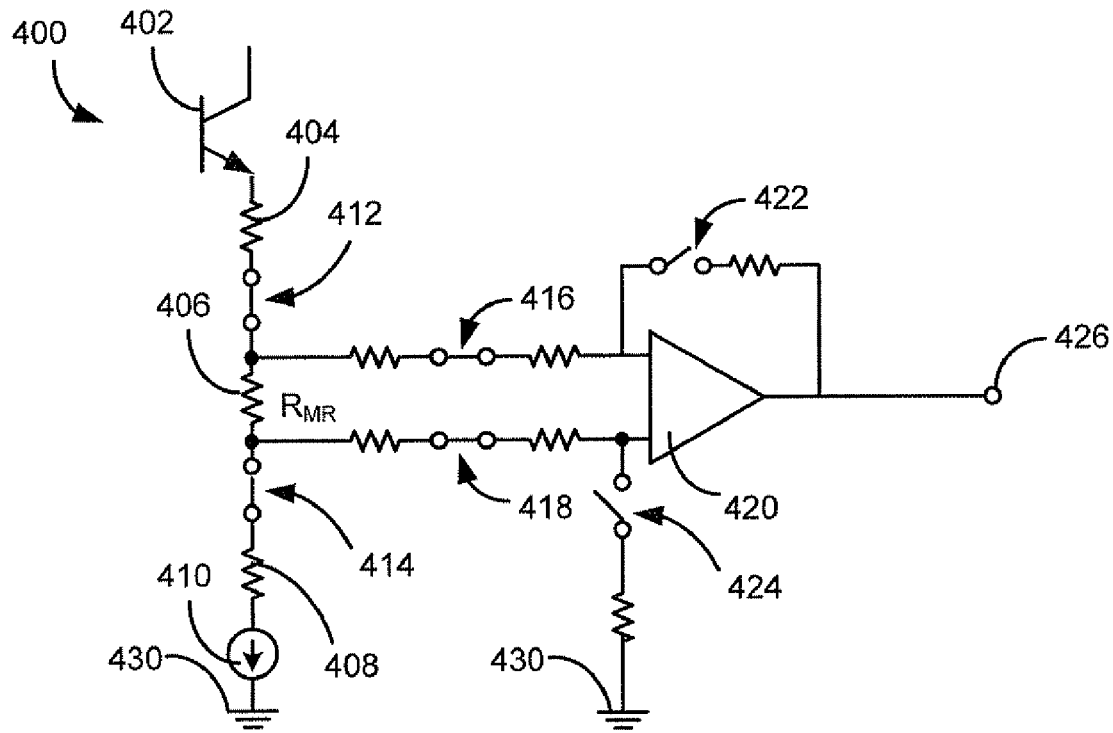
FIG. 4 is a diagram of another illustrative embodiment of a circuit representation of a portion of a data storage device.

Referring to FIG. 4, a diagram of another illustrative embodiment of a circuit representation of a portion of a data storage device is depicted and generally designated 400. A first transistor 402 is serially coupled to a first resistor 404, a second resistor $R_{MR}$ 406, a third resistor 408, and a current source 410 to a ground 430. A first switching element 412 is coupled between the first resistor 404 and the $R_{MR}$ 406. A second switching element 414 is coupled between the $R_{MR}$ 406 and the third resistor 408. A first input and a second input of an amplifier 420 are coupled across the $R_{MR}$ 406 via a third switching element 416 and a fourth switching element 418, respectively. A feedback path between an output 426 and the first input of the amplifier 420 includes a fifth switching element 422. The second input of the amplifier 420 is further coupled to the ground 430 via a sixth switching element 424. In a particular embodiment, the circuit representation 400 may be incorporated into an Analog Buffered Head Voltage (ABHV) component of a preamplifier.

During operation, in a particular embodiment, differential mode voltage sensing across the $R_{MR}$ 406 may be performed by closing the switching elements 412, 414, 416, and 418, and opening the switching elements 422 and 424, as depicted in FIG. 4. In the configuration of FIG. 4, the amplifier 420 produces a signal at the output 426 that indicates a voltage difference across the $R_{MR}$ 406.

Figure 5:
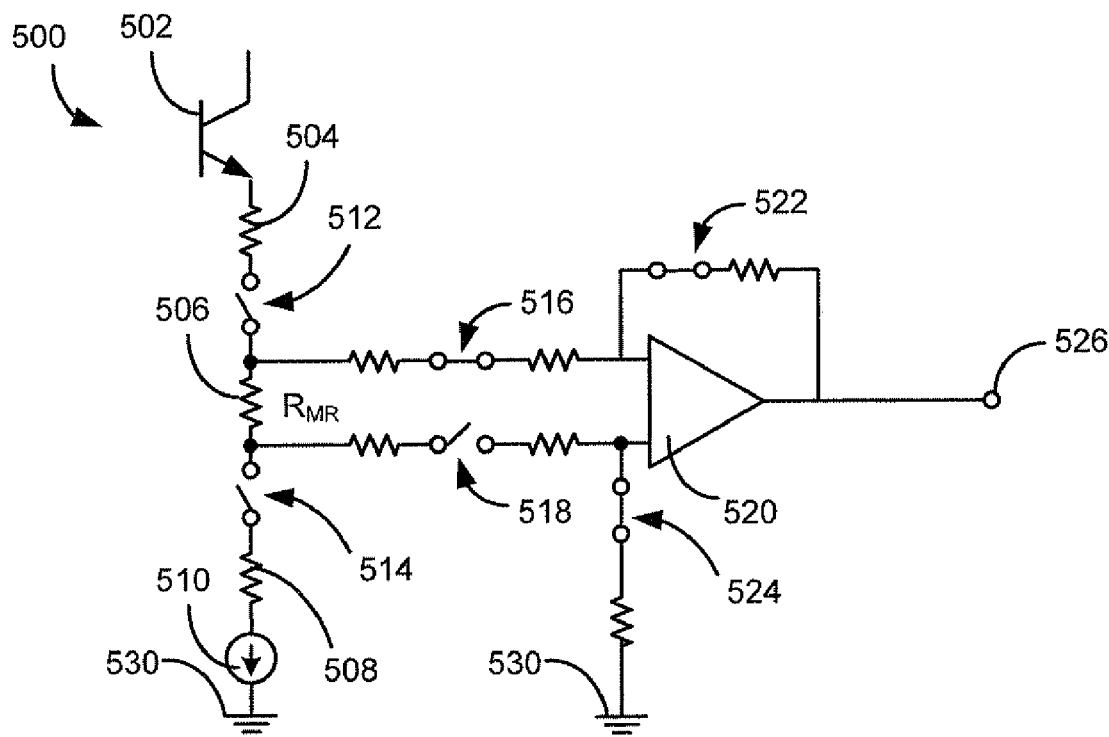
FIG. 5 is a diagram of another illustrative embodiment of a circuit representation of a portion of a data storage device.

Referring to FIG. 5, a diagram of another illustrative embodiment of a circuit representation of a portion of a data storage device is depicted and generally designated 500. A first transistor 502 is serially coupled to a first resistor 504, a second resistor $R_{MR}$ 506, a third resistor 508, and a current source 510 to a ground 530. A first switching element 512 is coupled between the first resistor 504 and the $R_{MR}$ 506. A second switching element 514 is coupled between the $R_{MR}$ 506 and the third resistor 508. A first input and a second input of an amplifier 520 are coupled across the $R_{MR}$ 506 via a third switching element 516 and a fourth switching element 518, respectively. A feedback path between an output 526 and the first input of the amplifier 520 includes a fifth switching element 522. The second input of the amplifier 520 is further coupled to the ground 530 via a sixth switching element 524. In a particular embodiment, the circuit representation 500 may be incorporated into an Analog Buffered Head Voltage (ABHV) component of a preamplifier.

During operation, in a particular embodiment, common mode voltage sensing across $R_{MR}$ 506 may be performed by opening the switching elements 512, 514, and 518, and closing the switching elements 516, 522, and 524, as depicted in FIG. 5. In the configuration of FIG. 5, the amplifier 520 produces a signal at the output 526 that indicates a voltage difference between $R_{MR}$ 506 and ground.

In a particular embodiment, one or more controllers (not shown) or other logic may control one or more of the switching elements 412, 414, 416, 418, 422, and 424 of FIG. 4. In a particular embodiment, the one or more controllers or other logic may selectively enable differential mode voltage sensing, as depicted in FIG. 4, or common mode voltage sensing, as depicted in FIG. 5, using the amplifier 420.

Figure 6:
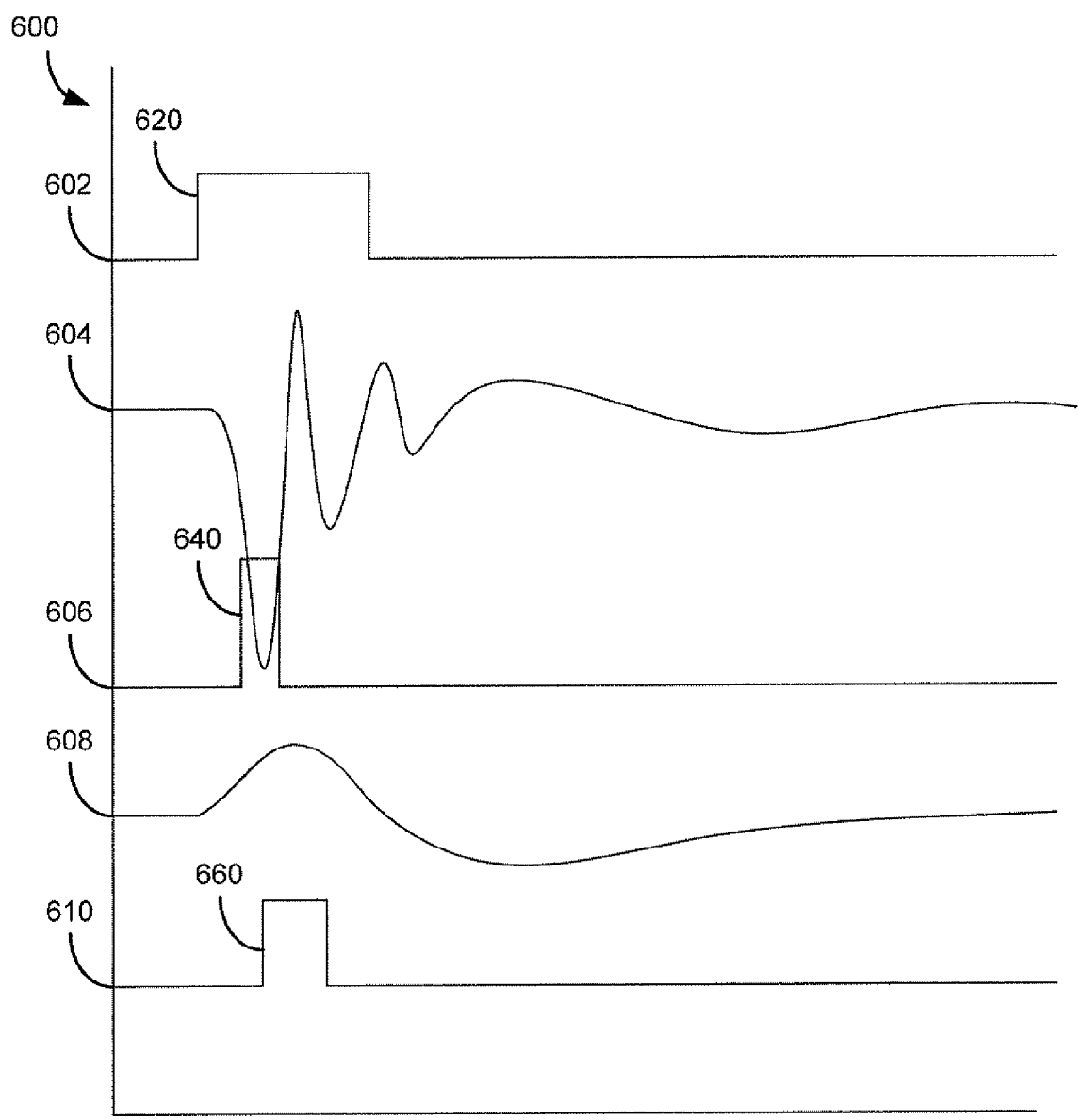
FIG. 6 is a timing diagram of a particular illustrative embodiment of a data storage device.

Referring to FIG. 6, a timing diagram of a particular illustrative embodiment of a data storage device is depicted and generally designated 600. A first signal 602 depicts an operating condition at a transducer. A second signal 604 depicts a common mode voltage at a read element of a transducer compared to a preamplifier ground. A third signal 606 depicts a fault detection output signal responsive to the second signal 604. A fourth signal 608 depicts a common mode voltage at a read element of a transducer compared to a system ground. A fifth signal 610 depicts a fault detection output signal responsive to the fourth signal 608.

In a particular embodiment, the first signal 602 transitions from a normal operating condition to a fault condition at transition 620. In a particular embodiment, the fault condition may be a contact event between the transducer and data storage medium. In a particular embodiment, the fault condition may result in an electrical discharge to or from the transducer.

In a particular embodiment, the second signal 604 may indicate an output of a differential amplifier that receives the common mode voltage of the read element at a first input and a preamplifier ground at a second input. In a particular embodiment, the second signal 604 may be detected at the output 320 of the third amplifier 310 of FIG. 3.

In a particular embodiment, the third signal 606 may be generated by a comparison of the second signal 604 to a first predetermined threshold voltage. When the second signal 604 exceeds the first predetermined threshold voltage, the third signal 606 transitions from a non-fault state to a fault state at transition 660. In a particular embodiment, the third signal 606 may be generated at a fault pin of a disc drive preamplifier circuit.

In a particular embodiment, the fourth signal 608 may indicate an output of a differential amplifier that receives the common mode voltage at the read element at a first input and a system ground at a second input. In a particular embodiment, the differential amplifier may be located at a printed circuit board, such as the printed circuit board 132 of FIG. 1.

In a particular embodiment, the fifth signal 610 may be generated by a comparison of the fourth signal 608 to a second predetermined threshold voltage. When the fourth signal 608 exceeds the second predetermined threshold voltage, the fifth signal 610 transitions from a non-fault state to a fault state at transition 660. In a particular embodiment, the fifth signal 610 may be generated at a fault pin of a printed circuit board.

Figure 7:
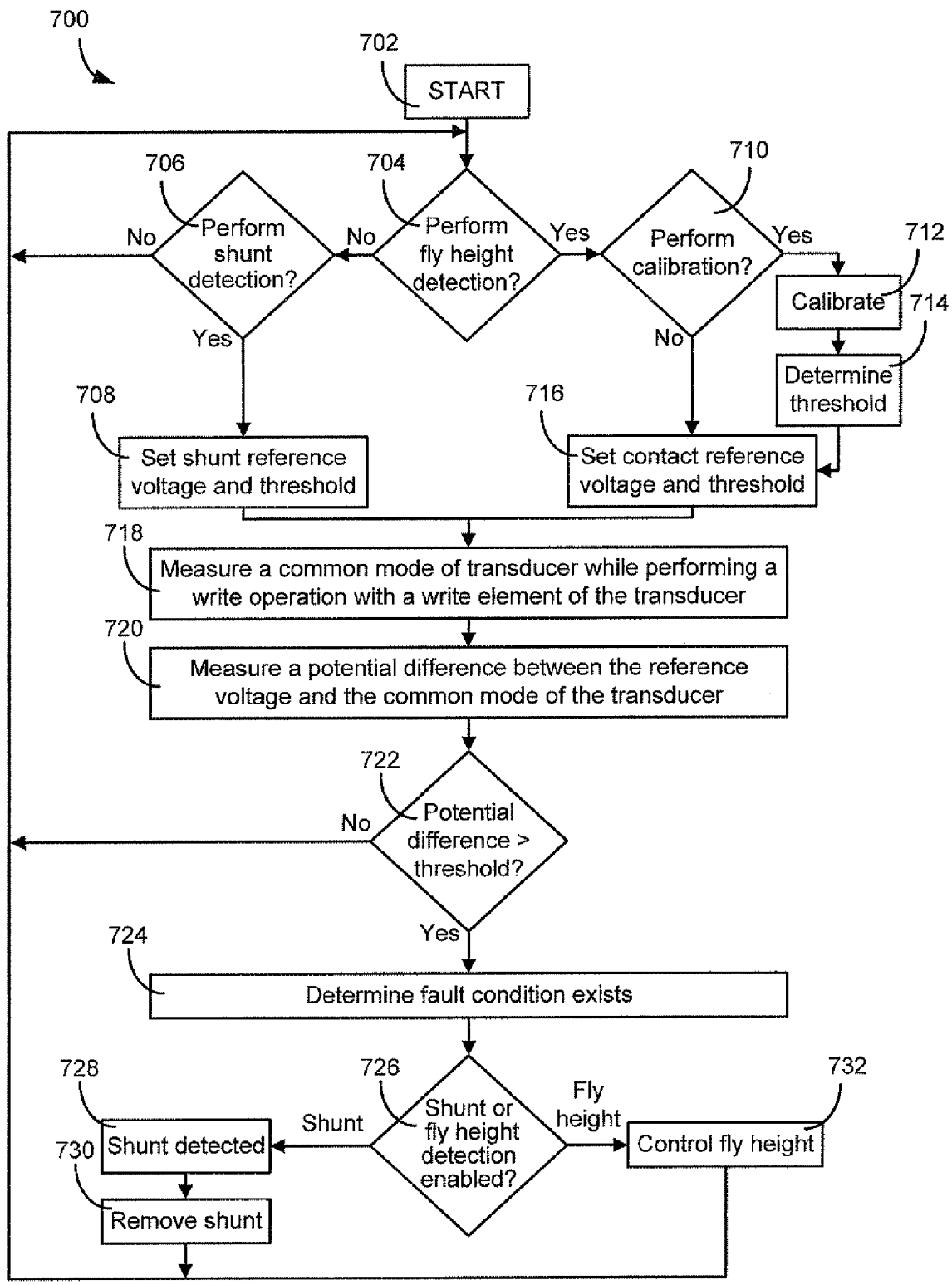
FIG. 7 is a flow diagram of a particular illustrative embodiment of a method of detecting an operating condition.

Referring to FIG. 7, a flow diagram of a particular illustrative embodiment of a method of detecting an operating condition is depicted and generally designated 700. The method 700 begins, at 702. In a particular embodiment, a determination may be made whether a fly height detection will be performed, at 704. In a particular embodiment, when fly height detection will be performed, a determination may be made whether a fly height calibration will be performed, at 710.

In a particular embodiment, when the fly height calibration will be performed, the fly height calibration may be performed, at 712. In a particular embodiment, the calibration may include causing a contact between a transducer and a data storage medium. In a particular embodiment, the transducer may be a transducer for reading and writing data to the data storage medium. In a particular embodiment, a threshold may be determined, at 714. In a particular embodiment, the threshold may be determined based on a result of the calibration to detect a contact event during operation of the transducer.

In a particular embodiment, a contact reference voltage and the threshold may be set, at 716. In a particular embodiment, the contact reference voltage may be a ground, such as a preamplifier ground or a system ground. In a particular embodiment, the contact reference voltage may be set via the first switching element 318 of FIG. 3. In a particular embodiment, the threshold may be set at a controller that compares the output 320 of FIG. 3 to the threshold.

In a particular embodiment, a common mode of the transducer may be measured while performing a write operation with a write element of the transducer, at 718. In a particular embodiment, the common mode measurement may measure a common mode of a read element of the transducer.

In a particular embodiment, a potential difference between the reference voltage and the common mode of the transducer may be measured, at 722. In a particular embodiment, the potential difference may be caused by an electrical discharge to or from the data storage medium. In a particular embodiment, the potential difference may be measured using an amplifier, such as the third amplifier 310 of FIG. 3.

In a particular embodiment, the potential difference may be compared to the threshold, at 722. In a particular embodiment, when the potential difference is greater than the threshold, a fault condition may be determined to exist, at 724. In a particular embodiment, the fault condition may include a contact event between the transducer and the data storage medium.

In a particular embodiment a determination may be made whether a shunt or fly height detection is enabled, at 726. In a particular embodiment, when fly height detection is enabled, a fly height may be controlled, at 732, and a determination may be made whether a fly height detection will be performed, at 704. In a particular embodiment, a fly height of a transducer may be controlled based on the potential difference.

In a particular embodiment, when a determination is made that a fly height detection will not be performed, at 704, a determination may be made whether a shunt detection will be performed, at 706. In a particular embodiment, when a determination is made that a shunt detection will not be performed, a determination may be made whether a fly height detection will be performed, at 704.

In a particular embodiment, if a determination is made to perform shunt detection, a shunt reference voltage and threshold may be set, at 708. In a particular embodiment, the shunt reference voltage may be a system supply voltage. In a particular embodiment, the shunt reference voltage may be based on a heater driver output voltage. In a particular embodiment, the shunt reference voltage may be coupled to the second input 314 of the third amplifier 310 via the first switching element 318 of FIG. 3. In a particular embodiment, the threshold may be set at a controller that compares the output 320 of FIG. 3 to the threshold.

In a particular embodiment, a common mode of the transducer may be measured while performing a write operation with a write element of the transducer, at 718. In a particular embodiment, the common mode measurement may measure a common mode of a read element of the transducer.

In a particular embodiment, a potential difference between the reference voltage and the common mode of the transducer may be measured, at 722. In a particular embodiment, the potential difference may be measured using an amplifier, such as the third amplifier 310 of FIG. 3.

In a particular embodiment, a potential difference may be compared to the threshold, at 722. In a particular embodiment, when the potential difference is greater than the threshold, a fault condition may be determined to exist, at 724. In a particular embodiment, a determination may be made whether a shunt or fly height detection is enabled, at 726.

In a particular embodiment, when a shunt detection is enabled, a shunt may be detected, at 728. In a particular embodiment the shunt may be an electrically removable shunt coupled to the transducer. In a particular embodiment, the shunt may be removed, at 730, and a determination may be made whether a fly height detection will be performed, at 704.

In a particular embodiment, when the potential difference is not greater than the threshold, at 722, a determination may be made whether a fly height detection will be performed, at 704.

Figure 8:
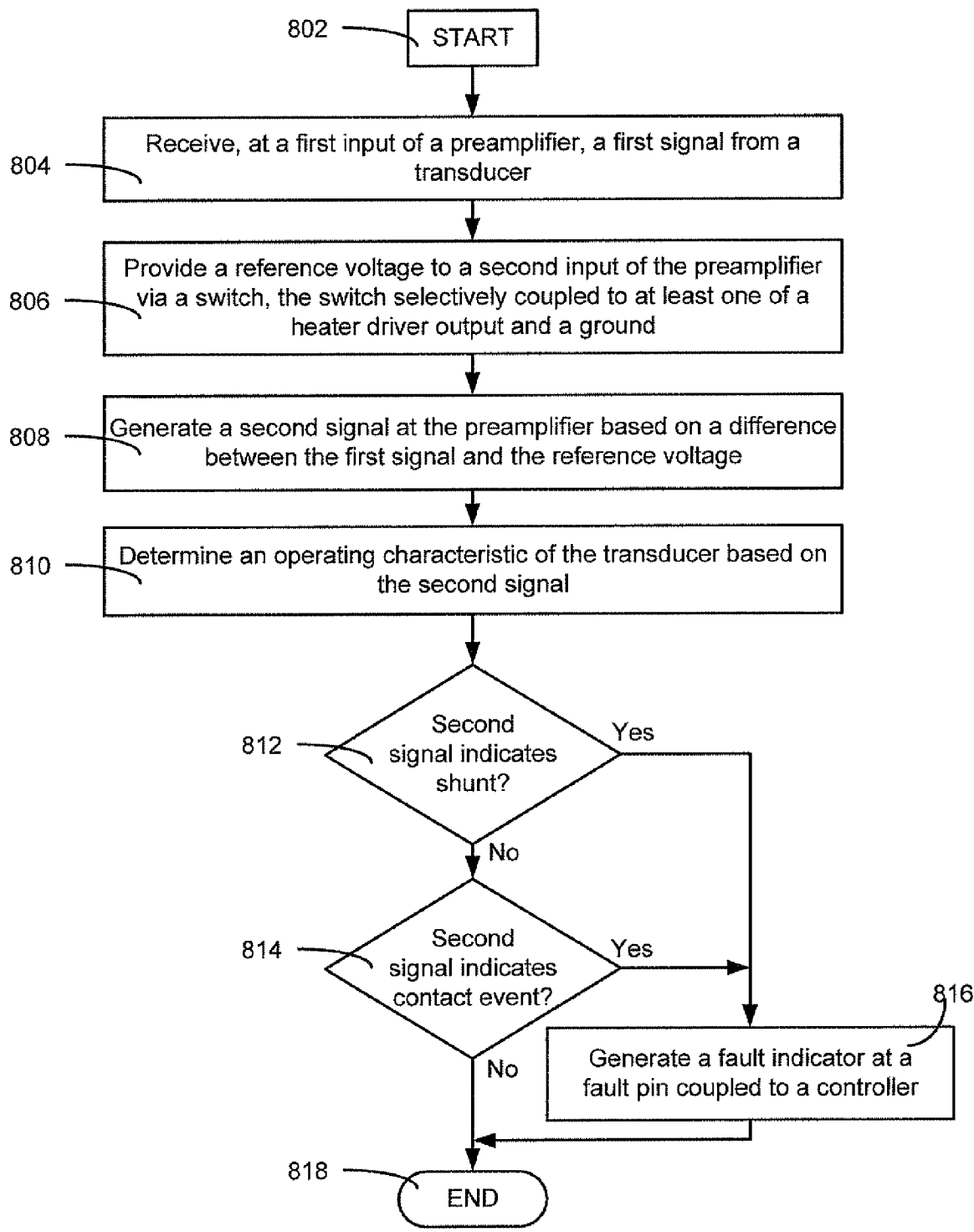
FIG. 8 is a flow diagram of another illustrative embodiment of a method of detecting an operating condition.

Referring to FIG. 8, a flow diagram of another illustrative embodiment of a method of detecting an operating condition is depicted and generally designated 800. The method 800 begins, at 802 In a particular embodiment, a first signal may be received at a first input of a preamplifier from a transducer, at 804. In a particular embodiment, the first signal may be based on a common mode voltage of the transducer. In a particular embodiment, the transducer may include a data read element and a data write element. The transducer may read data from a data storage medium with the data read element, and may write data to the data storage medium with the data write element.

In a particular embodiment a reference voltage may be provided to a second input of the preamplifier via a switch, at 806. The switch may be selectively coupled to at least one of a heater driver output and a ground. In a particular embodiment, the ground may be one of a preamplifier ground and a system ground.

In a particular embodiment, a second signal may be generated at the preamplifier based on a difference between the first signal and the reference voltage, at 808. In a particular embodiment, an operating characteristic of the transducer may be determined based on the second signal, at 810. In a particular embodiment, the reference voltage may be the ground, and the operating characteristic may be a fly height of the transducer over a data storage medium. In a particular embodiment, the reference voltage may be the heater driver output, and the operating characteristic may include a resistive shunt across the transducer. In a particular embodiment, the resistive shunt may be electrically removable.

In a particular embodiment, a determination may be made whether the second signal indicates a shunt, at 812. In a particular embodiment, when the second signal is determined to indicate a shunt, a fault indicator may be generated at a fault pin coupled to a controller, at 816.

In a particular embodiment, when the second signal is not determined to indicated a shunt, a determination may be made whether the second signal indicates a contact event, at 814. In a particular embodiment, when the second signal is determined to indicate a contact event with the data storage medium, a fault indicator may be generated at a fault pin coupled to a controller, at 816. In a particular embodiment, the contact event may include contact with a thermal asperity. In a particular embodiment, a location may be mapped based on the thermal asperity, and the location may be avoided on a subsequent operation of the transducer.

When the second signal does not indicate a shunt or a contact event or when the fault indicator is generated, the method 800 ends, at 818.

In accordance with various embodiments, the methods described herein may be implemented as one or more software programs running on a computer processor or controller, such as the controller 220. In accordance with another embodiment the methods described herein may be implemented as one or more software programs running on a host device, such as a PC that is using a disc drive. Dedicated hardware implementations including, but not limited to, application specific integrated circuits, programmable logic arrays and other hardware devices can likewise be constructed to implement the methods described herein.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
    measuring a potential difference between a reference voltage and a common mode of a transducer for reading and writing data to a data storage medium;
    determining when a fault condition of the transducer exists based on the potential difference;
    detecting an existence of an electrically removable resistive shunt coupled to the transducer based on the fault condition; and
    removing the electrically removable resistive shunt when detected.

2. The method of claim 1, wherein the fault condition includes a contact event between the transducer and the data storage medium.

3. The method of claim 2, further comprising:
    performing a calibration that includes contacting the transducer to the data storage medium;
    determining the threshold based on the calibration; and comparing the potential difference to the threshold to determine when the fault condition exists.

4. The method of claim 3, further comprising controlling a fly height of the transducer based on the potential difference.

5. The method of claim 3, further comprising detecting the contact event by monitoring a potential difference caused by an electrical discharge from the data storage medium.

6. The method of claim 1, wherein the fault condition includes contact with a thermal asperity by the transducer.

7. The method of claim 1, wherein the reference voltage is a system supply voltage.

8. The method of claim 7, wherein the reference voltage is based on a heater driver output voltage.

9. The method of claim 1, further comprising measuring the common mode of the transducer while performing a write operation with a write element of the transducer.

10. A method, comprising:
receiving, at a first input of a preamplifier, a first signal from a transducer;
providing a reference voltage to a second input of the preamplifier;
generating a second signal at the preamplifier based on a difference between the first signal and the reference voltage;
determining an operating characteristic of the transducer based on the second signal;
detecting an existence of an electrically removable resistive shunt coupled to the transducer based on the operating characteristic; and
removing the electrically removable resistive shunt when detected.

11. The method of claim 10, wherein the first signal is based on a common mode voltage of the transducer.

12. The method of claim 11, further comprising generating a fault indicator at a fault pin coupled to a controller when the electrically removable resistive shunt is detected.

13. The method of claim 10, wherein the reference voltage is a heater driver output.

14. The method of claim 10, wherein the ground is one of a preamplifier ground and a system ground.

15. The method of claim 10, wherein the reference voltage is the ground, and wherein the operating characteristic is a fly height of the transducer over a data storage medium.

16. The method of claim 15, further comprising generating a fault indicator at a fault pin when the second signal indicates a contact event with the data storage medium.

17. The method of claim 16, wherein the contact event includes contact with a thermal asperity.

18. The method of claim 17, further comprising:
mapping a location based on the thermal asperity; and
avoiding the location on a subsequent operation of the transducer.

19. The method of claim 16, wherein the transducer includes a data read element and a data write element, wherein the transducer reads data from the data storage medium with the data read element, and wherein the transducer writes data to the data storage medium with the data write element.

20. A system, comprising:
an amplifier having a first input and a second input, the first input coupled to receive a common mode signal from a transducer;
a switch to selectively couple the second input of the amplifier to one of a first reference voltage and a second reference voltage, wherein a fault condition is determinable based on a position of the switch; and
wherein the fault condition comprises an existence of an electrically removable resistive shunt coupled to the transducer and the system is configured to remove the electrically removable resistive shunt when detected.

21. The system of claim 20, wherein the fault condition also comprises:
a contact event between the transducer and a data storage medium.

22. The system of claim 20, wherein the first reference voltage is one of a preamplifier ground voltage and a system ground voltage.

23. The system of claim 20, wherein the second reference voltage is provided by a heater driver.

* * * * *